Feb. 24, 1970  V. F. VOLK  3,497,294
SELF-VENTILATED EYEGLASS MEANS
Filed May 22, 1967
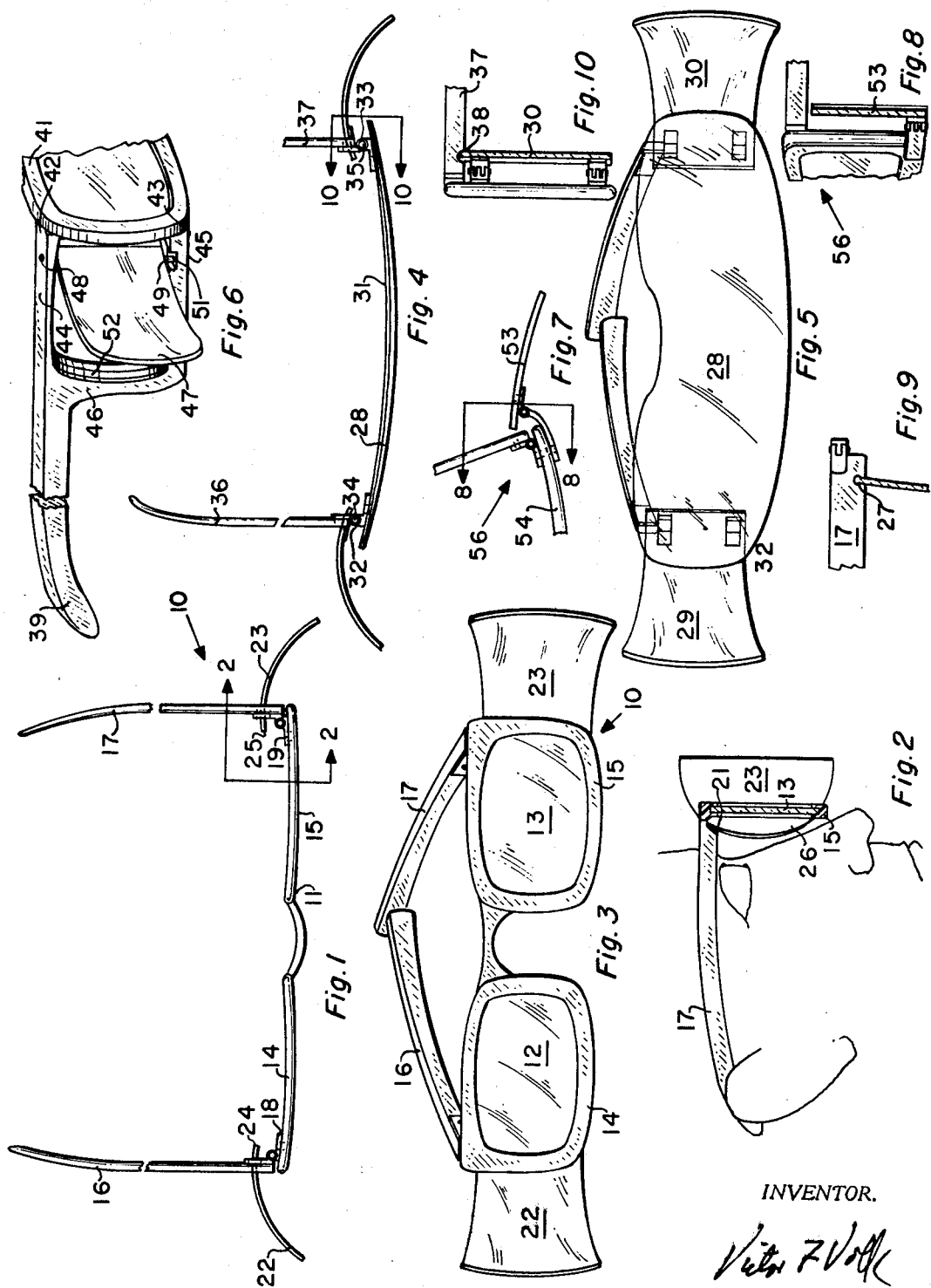
INVENTOR.
Victor F. Volk United States Patent Office 3,497,294
Patented Feb. 24, 1970

3,497,294
SELF-VENTILATED EYEGLASS MEANS
Victor F. Volk, 15 W. 75th St.,
New York, N.Y. 10023
Filed May 22, 1967, Ser. No. 640,034
Int. Cl. G02c 11/08
U.S. Cl. 351—41                                   1 Claim

ABSTRACT OF THE DISCLOSURE

Spectacles, sunglasses, goggles, etc. are fitted with laterally extending vanes which direct air behind the lenses and provide ventilation.

BACKGROUND OF THE INVENTION

My invention is directed to an improvement in sunglasses, spectacles, goggles and the like which I describe collectively herein by the term eyeglasses and by which I include articles having lenses of transparent organic plastic, of which different types are known, as well as articles having glass lenses.

It has long been a defect of eyeglasses and particularly of sunglasses that persons wearing them are deprived of the cooling effect of air flow on the areas of the face directly behind the lenses, and surrounding frames, if any. In the case of sunglasses this defect is particularly objectionable because sunglasses are most often worn in hot weather, and on beaches which are frequented for the express purpose of exposure to fresh air.

SUMMARY

In the eyeglasses of my invention the ventilation defect of known eyeglasses is overcome by not only permitting but directing a flow of air behind the glasses or other lens means. To accomplish this the eyeglass means of my invention comprise lens means that may be glass or plastic. I use the term "lens means" herein to include members individually shaped, one for each eye and also a single member shaped to extend across both eyes. Lenses are known and are included within the scope of my invention in a wide range of transparencies; sunglasses, in particular, sacrificing light transmission to exclude harmful sun rays. My invention also includes lenses that are fully opaque except for small pin-holes or slits to see through. Where such slits are narrow they do not provide sufficient ventilation to negate the need for the improvement of this invention.

My eyeglass means also comprise means supporting the lens means in front of the eyes of a person wearing them. These supporting means may comprise temples and the lens means may comprise rims for the lenses. An essential feature of my invention are ventilating vanes mounted on the eyeglass means extending laterally from a position posterior to the lens means and directing air to flow behind the lens means. These vanes are preferably plastic and preferably extend forwardly as well as laterally as will be more fully described with reference to the appended drawing. The vanes and the lens means (including the rims when present) define a channel for the passage of air behind the lens means.

Many plastics are known, suitable for the vanes of my invention such as polyolefin, polystyrene, nylon, polycarbonate, polyvinyl chloride, acrylic and others. In one favored embodiment my eyeglass means comprises temples extending from upper points of the lens means with the vanes fastened to and extending below the temples, and in another embodiment the temples have extensions to both upper and lower points on said lens means and the vanes are pivotally fastened between these arms.

The vanes of my eyeglass means may be detachable and they may be hinged to fold behind or in front of the lens means.

BRIEF DESCRIPTION OF THE DRAWING

FIGURE 1 shows a plan view of an eyeglass means of my invention.
FIGURE 2 shows a section through the line 2—2 of FIGURE 1.
FIGURE 3 shows a front view of the eyeglass means of FIGURE 1.
FIGURE 4 shows a plan view of another embodiment of my invention.
FIGURE 5 shows a front view of the embodiment of FIGURE 4.
FIGURE 6 shows a pictorial view of still another embodiment of my invention.
FIGURE 7 shows a top view of an embodiment of my invention wherein the vanes are hinged.
FIGURE 8 shows a section through the line 8—8 of FIGURE 7.
FIGURE 9 shows a section of a detail of one embodiment of my invention.
FIGURE 10 shows a section through the line 10—10 of FIGURE 4.

DESCRIPTION OF THE PREFERRED EMBODIMENTS

Referring to the FIGURES 1–3 the eyeglass indicated generally by the numeral 10 has lens means 11 comprising transparent lenses 12, 13 and supported respectively in rims 14, 15. Supporting means comprising temples 16, 17 extend rearwardly of the lens means 11. The temples 16, 17 are fastened to the tops of the frames 14, 15 by means of hinges 18, 19 in a known manner. A lower portion of each of the temples 16, 17 is cut away at 21 and curved vanes 22, 23 are fastened to the temples 16, 17 so as to extend from the points 24, 25 posterior to the lens means or frame, laterally and forwardly on both sides so as to direct air behind the lenses. It is an important feature of my invention that a channel or passageway 26 is formed behind the lens means defined by the vane 23 (FIGURE 2) and the frame 15. I have shown the vanes 22, 23 rigidly cemented to the temples 16, 17, but it will be understood that, for the purpose of convenient storage the vanes 22, 23 might be hinged to the temples to fold back thereon or might be detachably mounted by insertion into a slot 27 (FIGURE 9) cut into the temple 17, in a snap fit.

In FIGURES 4 and 5 I have shown the application of my invention to eyeglasses of the type particularly suitable to sunglasses where both lenses are comprised in a single transparent member 28 with no separate supporting frame. Here vanes 29, 30 might be attached to temples 36, 37 in the manner of FIGURES 1–3 but I have preferred to hinge them directly to the member 28 in such a manner that they can be folded against the concave surface 31 of the member 28. Air passageways 32, 33 are, of course, provided by the separation of the member 28 from the vanes 29, 30 afforded by hinges 34, 35. In use, the vanes 29, 30 are held open by engagement with notches in the temples 36, 37 such as the notch 38 in the temple 37 shown in FIGURE 10.

In FIGURE 6 I have illustrated an embodiment of my invention wherein the temples such as a temple 39 is connected to a lens means 41 at upper and lower points 42, 43 by means of two arms 44, 45 and an upright 46.

A vane 47 which is preferably transparent can be kept closed and fitted within the frame provided by the members 44, 45, 46 when ventilation is not needed, and pressed forward, as shown, when ventilation is desired. In this embodiment the vane 47 is supported by two pins 48, 49 which fit into matching holes in the respective arms 44, 45. In the open position the vane 47 drops into a slot 51 in the arm 45. A groove 52 in the upright 46 provides a catch to lock the vane 47 in its closed position.

In the embodiment of FIGURES 7 and 8 a vane 53 is hinged to a rim 54 of the lens means of an eyeglass indicated generally by the numeral 56 in such a manner that it can be folded forward when the eyeglass is not being worn.

I claim:
1. Eyeglass means comprising:
  (A) lens means,
  (B) means, comprising temples, for supporting said lens means in front of the eyes of a person wearing said eyeglass means, said temples having widened forward portions comprising arms defining upper and lower boundaries of openings in said temples,
  (C) ventilating vanes pivotally mounted between said arms posterior to said lens means, said vanes being pivotable to a ventilating position and a non-ventilating position, said vanes in said ventilating position extending laterally and forwardly, thereby defining, with said lens means, passageways for air and directing air to flow through said passageways directly behind said lens means, and said vanes in said non-ventilating position closing said openings.

References Cited

FOREIGN PATENTS

| 794,475 | 1935 | France. |
|---------|------|---------|
| 574,301 | 1958 | Italy.  |

DAVID SCHONBERG, Primary Examiner

ALLEN M. OSTRAGER, Assistant Examiner

U.S. Cl. X.R.
351—62, 111